United States Patent [19]

Schanz

[11] 4,339,921

[45] Jul. 20, 1982

[54] BRAKE BOOSTER FOR AN AUTOMOTIVE VEHICLE

[75] Inventor: Johannes Schanz, Bad Homburg, Fed. Rep. of Germany

[73] Assignee: ITT Industries, Inc., New York, N.Y.

[21] Appl. No.: 49,706

[22] Filed: Jun. 18, 1979

[30] Foreign Application Priority Data

Jul. 10, 1978 [DE] Fed. Rep. of Germany ....... 2830262

[51] Int. Cl.$^3$ ............................................. B60T 13/00
[52] U.S. Cl. .............................. 60/547 R; 91/369 R; 92/13; 92/13.2; 92/98 D; 92/165 PR; 60/581
[58] Field of Search ................ 92/98 D, 102, 165 PR, 92/166, 13, 13.2; 91/369 R, 369 A, 369 B, 376 R; 60/547 R, 581

[56] References Cited

U.S. PATENT DOCUMENTS

| | | | |
|---|---|---|---|
| 2,369,797 | 2/1945 | Rappl | 92/166 |
| 2,987,888 | 6/1961 | Crowell | 92/166 |
| 2,997,027 | 8/1961 | Ingres | 92/98 D |
| 3,145,628 | 8/1964 | Medley | 92/166 |
| 3,411,409 | 11/1968 | Bunyard | 92/166 |
| 3,537,358 | 11/1970 | Bunyard | 92/166 |
| 3,813,992 | 6/1974 | Brown | 92/48 |
| 4,256,016 | 3/1981 | Thomas | 91/369 A |
| 4,270,353 | 6/1981 | Thomas | 60/547 R |
| 4,271,750 | 6/1981 | Thomas | 92/98 D |

FOREIGN PATENT DOCUMENTS 2306630 9/1974 Fed. Rep. of Germany ... 92/165 PR

*Primary Examiner*—Abraham Hershkovitz
*Attorney, Agent, or Firm*—John T. O'Halloran; Alfred C. Hill

[57] ABSTRACT

The vacuum casing of vacuum brake boosters is conventionally made of sheet steel. The vacuum casing is subjected to pneumatic and mechanical forces absorbed by the casing parts. Accordingly, the casing parts must be suitably strong, which results in added costs and added weight. To eliminate these and other disadvantages, there is disclosed a vacuum brake booster comprising at least two bolts extending through the vacuum casing parallel to the master cylinder push rod connected to the end walls of the casing and through at least one movable wall in the casing. The movable wall is slidably disposed on the bolts by means of slide seats.

6 Claims, 2 Drawing Figures

BRAKE BOOSTER FOR AN AUTOMOTIVE VEHICLE

BACKGROUND OF THE INVENTION

The present invention relates to a brake booster and more particularly to a brake booster for an automotive vehicle operated by the differential of pressure between a vacuum and atmospheric pressure.

From German patent DE-AS 2,345,314 a brake booster for an automotive vehicle is known which is operated by the differential of pressure between a vacuum and atmospheric pressure. This brake booster comprises a vacuum casing, a movable wall disposed therein and a control valve, the movable wall including a diaphragm dividing the vacuum casing into a vacuum chamber of constant vacuum and a working chamber of different pressures and acting on a push rod guided in the axial direction of the brake booster. On the side of the vacuum casing close to the control valve, the casing end wall includes several bolts serving to secure the brake booster to the splash wall of an automotive vehicle. On the other side of the vacuum casing where the end of the push rod extends out of the casing end wall, the master cylinder is mounted. As a rule, this mounting is likewise by means of bolts to bolt the master-cylinder flange to this casing end wall.

In an arrangement of this type, the vacuum casing is conventionally of sheet steel. As a result of the pressure differential between the vacuum and the atmospheric pressure, pneumatic forces act on the vacuum casing. These forces, which somewhat compress the vacuum casing, have to be taken up by the components of the vacuum casing. To limit the amount of deformation of the vacuum casing, it is necessary to provide the casing components with an appropriate strength. These designs are, however, not economical because of the resultant increase in the material costs in addition to being of a high weight. Thus, such an arrangement is unable to comply with the vehicle manufacturers' demands for the lowest possible weight of brake systems without the safety and operability of the brake booster being impaired.

The arrangement disclosed in the present invention is of particular importance for a mechanically controlled brake booster utilizing the pressure differential between a vacuum and atmospheric pressure and comprising a vacuum casing having at least one movable wall disposed therein, the movable wall dividing the vacuum casing into a vacuum chamber and a working chamber and acting upon a push rod guided in the axial direction of the brake booster, with means for fastening the brake booster to a splash wall being provided on the vacuum casing on a casing end wall where a rod for the introduction of force extends into the vacuum casing, and further means for fastening a master cylinder being provided on the opposite casing end wall. The vacuum casing of such a brake booster as it is described, for example, in the above cited German Patent DE-AS 2,345,314, is subjected to high forces, and this is the main problem as pointed out below.

As the brake pedal is depressed, the force transmitted by the brake pedal and the booster force are active on the push rod. The total force resulting therefrom acts on the piston of the master cylinder, the resistance of the compressed hydraulic fluid in the master cylinder necessitating, however, the presence of an opposed force component maintaining the master cylinder approximately in its position. This reaction force is transferred from the master cylinder via the sheet-metal components of the vacuum casing to the splash wall where the pedal support is usually fastened.

On actuation of the brake booster, the reaction force results in an elongation of the vacuum casing in an axial direction and, consequently, in a displacement of the master cylinder which adds to the lost travel of the brake pedal. Because of the brake-lever transmission ratio, the elongation of the vacuum casing is increased by a multiple and transmitted to the brake pedal. The elongation is still further increased by the pneumatic forces acting on the vacuum casing. Their effects have to be taken into consideration to a still greater extent if the casing components are of reduced wall thickness.

SUMMARY OF THE INVENTION

It is, therefore, an object of the present invention to provide a brake booster of the type referred to hereinabove, which results in a reduction of the material costs and the weight.

A feature of the present invention is the provision of a brake booster for an automotive vehicle utilizing a pressure differential between a vacuum and atmospheric pressure comprising a vacuum casing having a control valve actuated by a brake pedal secured to one end wall thereof, a master cylinder push rod guided axially of the casing extending through the other end wall thereof and at least one movable wall disposed therein dividing the casing into a vacuum chamber and a working chamber and acting on the push rod; at least one member extending through the casing and the movable wall parallel to the push rod and connected to the one end wall and the other end wall; and at least one sealing means disposed in the movable wall and embracing the member to prevent leaks between the vacuum and working chambers and to enable the movable wall to slide on the member.

The essential advantages of the brake booster of the present invention are that the weight of the brake booster is reduced by the elimination of reinforcement of the casing and the use of thinner-walled components and that it is possible to manufacture the vacuum casing using lower-weight and less costly materials.

In mechanically controlled brake boosters, the advantages of the arrangement of the present invention, in addition to those mentioned in the foregoing, are in particular that (a) the lost travel of the brake pedal is reduced substantially because the vacuum casing is not subjected to the actuating force; and (b) the negative effects, with respect to the lost travel, of the pneumatic forces acting on the casing are eliminated.

In a preferred improvement of the subject matter of the invention, the bolts are bolted to at least one of the casing end walls. This arrangement permits adjustment of the length of the vacuum casing within the casing elasticity and thus a reduction of the clearance between the brake pedal and the master cylinder. In addition, the casing can be preloaded such that the bolts are practically relieved of the load in the presence of vacuum in the vacuum casing. In an advantageous embodiment of the bolts, their ends are so designed that they serve for fastening the brake booster to the splash wall and at the same time for fastening a master cylinder to the brake booster. This eliminates the need to provide the fastening screws herebefore used. It is particularly suitable in such an arrangement that the bolts extend through a hollow screw on the casing end wall of the brake booster close to the master cylinder. This arrangement permits assembly to the brake booster independently of the mounting of the master cylinder and, in the event of a replacement of the master cylinder during repair work, for example, enables the brake booster to remain in its fully assembled state and maintain its adjusted length, so that it is not necessary to provide additional means connecting the casing components.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
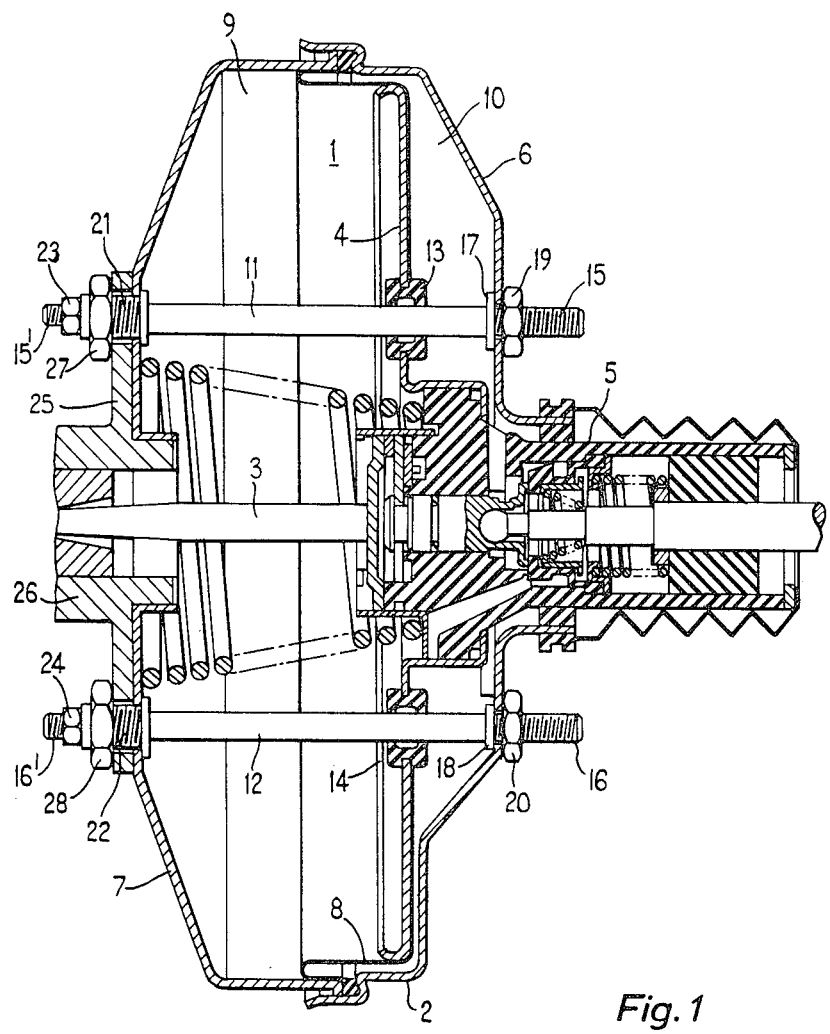
FIG. 1 is a longitudinal cross-sectional view through a brake booster having a master cylinder secured thereto in accordance with the principles of the present invention.

FIG. 1 shows a brake booster 1 comprising a two-part vacuum casing 2, a push rod 3 guided therein coaxially of casing 2 and having a movable wall 4 mounted thereon, and a control valve 5 to control the differential of pressure. Vacuum casing 2 comprises a casing shell 6 on the side close to control valve 5 and a casing shell 7 on the side close to a master cylinder, shells 6 and 7 being connected on their outer periphery with the outer edge of a rolling diaphragm 8 being clenched therebetween. The inner edge of rolling diaphragm 8 is secured to movable wall 4, thereby forming a vacuum chamber 9 and a working chamber 10 in vacuum casing 2.

Two bolts 11 and 12 extend through vacuum casing 2 in parallel with push rod 3, bolts 11 and 12 penetrating movable wall 4 which is provided with slide seals 13 and 14 surrounding bolts 11 and 12 to prevent leakage between vacuum chamber 9 and working chamber 10. Bolts 11 and 12 are of such length that their respective ends 15, 15' and 16, 16' extend out of vacuum casing 2. Ends 15 and 16 on the side close to control valve 5 are provided with respective rings 17 and 18 secured to bolts 11 and 12 as well as with respective threads extending from rings 17 and 18 up to the end of bolts 11 and 12. Rings 17 and 18 are situated on the inner side of casing shell 6 with nuts 19 and 20 being screwed onto ends 15 and 16 from the outside. In assembling the arrangement, rings 17 and 18 are sealed relative to casing shell 6, and ring seals may be used for that purpose, for example.

In casing shell 7 close to the master cylinder, hollow screws 21 and 22 are fitted, for example by means of riveting or welding, and ends 15' and 16' of bolts 11 and 12 extend therethrough. In this arrangement, bolts 11 and 12 are suitably sealed relative to hollow screws 21 and 22, and where applicable, hollow screws 21 and 22 are sealed relative to casing shell 7. Ends 15' and 16' are of a diameter smaller than the remaining part of bolts 11 and 12 and are provided with a thread having a respective nut 23 and 24 screwed thereon. Vacuum casing 2 is thereby clamped by means of bolts 11 and 12. The diagonal length of nuts 23 and 24 is not greater than the diameter of hollow screws 21 and 22.

A flange 25 of a master cylinder 26 is provided with bores and arranged at casing shell 7 with hollow screws 21 and 22 extending out of the bores of flange 25 and master cylinder 26 secured by means of the nuts 27 and 28 screwed onto the free ends of hollow screws 21 and 22.

The special design of the fastening of bolts 11 and 12 close to the master cylinder to casing shell 7 permits mounting or dismounting of master cylinder 26 without the necessity of removing bolts 11 and 12 from vacuum casing 2. Ends 15 and 16 of bolts 11 and 12 on the side close to control valve 5 are of such a predetermined length that they serve to secure brake booster 1 to a vehicle splash wall not shown in the drawing.

Figure 2:
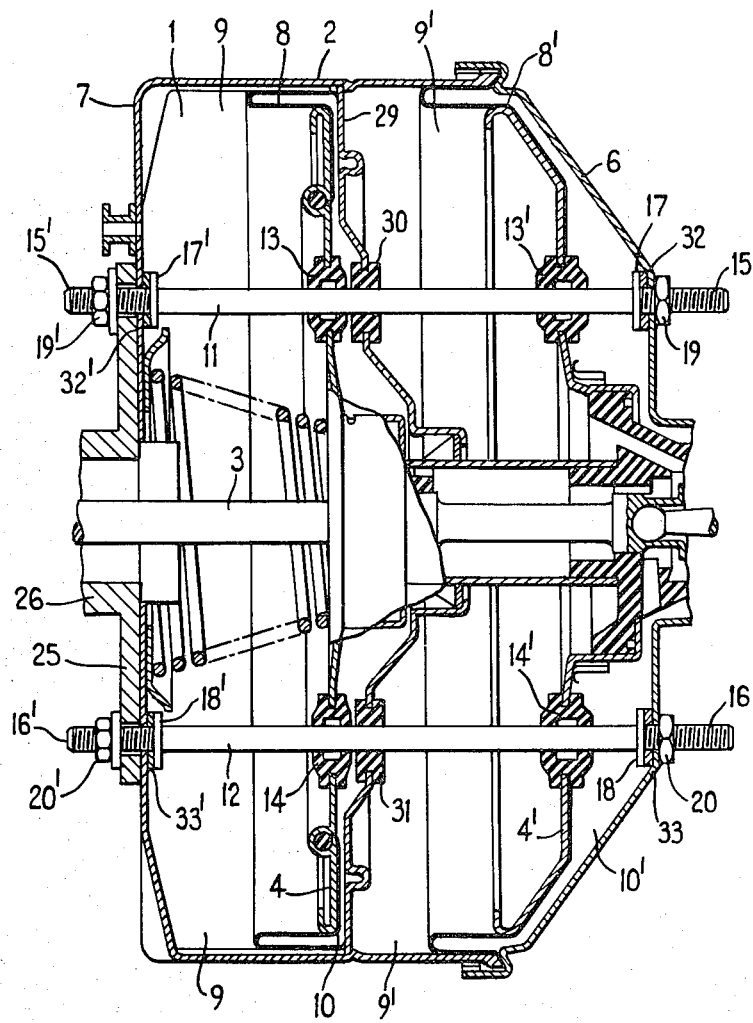
FIG. 2 is a longitudinal cross-sectional view through a tandem brake booster having a master cylinder secured thereto in accordance with the principles of the present invention.

FIG. 2 shows a brake booster 1 in tandem construction. Parts identical to those of FIG. 1 have been assigned reference numerals as employed in FIG. 1. In vacuum casing 2 including casing shell 6 on the side close to the control valve and casing shell 7 on the side close to master cylinder 26, is a rigid partition wall 29 subdividing vacuum casing 2 into two compartments. Situated in a first of these two compartments is a movable wall 4 with a rolling diaphragm 8 and in a second of these two compartments is a movable wall 4' with a rolling diaphragm 8' to form in each of the two compartments a vacuum chamber 9 and 9' and a working chamber 10 and 10'.

Vacuum casing 2 houses two bolts 11 and 12 parallel with push rod 3 and extending through suitable openings in rigid wall 29 and movable walls 4 and 4'. Provided in the openings of rigid wall 29 are ring seals 30 and 31 which embrace bolts 11 and 12. Provided in the openings of movable walls 4, 4' are slide seals 13, 13' and 14, 14' embracing bolts 11 and 12. Ends 15, 15' and 16, 16' project out of vacuum casing 2. Ends 15, 16 close to the control valve each have a respective ring 17 and 18 fitted to bolts 11 and 12 as well as a thread extending from rings 17 and 18 up to the end of bolts 11 and 12. Rings 17 and 18 abut against the inner wall of casing shell 6 with a respective ring seal 32 and 33 being interposed therebetween, and nuts 19 and 20 are screwed onto ends 15 and 16 from the outside. Ends 15 and 16 on the side close to the control valve are of such a predetermined length that they serve to secure brake booster 1 to a vehicle splash wall not shown in the drawing.

Ends 15' and 16' of bolts 11 and 12 are of the same construction as ends 15 and 16 described in the foregoing. Rings 17' and 18' are located on the inner wall of casing shell 7 with ring seals 32' and 33' being interposed between rings 17' and 18' and casing shell 7. A flange 25 of master cylinder 26 is provided with bores and arranged at casing shell 7 with ends 15' and 16' extending out of the bores of flange 25.

Rings 17, 17' and 18, 18' do not form part of bolts 11 and 12 but are separate components which at least on the one side are fitted to the bolts after bolts 11 and 12 have been passed through seals 13', 30, 13 and 14', 31, 14. Rings 17, 17' 18 and 18' may be provided with respective collar directed against the casing end wall, which collars, in the assembled state of brake booster 1, abut against casing shells 6 and 7.

By screwing on nuts 19' and 20' not only is vacuum casing 2 clamped together through bolts 11 and 12, but also master cylinder 26 is at the same time secured to brake booster 1.

Securing bolts 11 and 12 by means of hollow screws 21 and 22 (FIG. 1) as disclosed in the present invention makes it further possible to compensate for the deviations, due to manufacturing tolerance, in the distance between the point of push rod 3 and the abutment surface for master-cylinder flange 25 by variation of the axial length of vacuum casing 2 which is obtained by turning nuts 23 and 24.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake booster for an automotive vehicle utilizing a pressure differential between a vacuum and atmospheric pressure comprising:

a vacuum casing having a control valve actuated by a brake pedal secured to one end wall thereof, a master cylinder push rod guided axially of said casing extending through the other end wall thereof and at least one movable wall disposed therein dividing said casing into a vacuum chamber and a working chamber and acting on said push rod;

two bolts extending through said casing and said movable wall parallel to said push rod and connected to said one end wall and said other end wall to prevent deformation of said casing due to operating forces acting thereon; and two slide seals disposed in said movable wall each embracing a different one of said two bolts to prevent leaks between said vacuum and working chambers and to enable said movable wall to slide on said bolts;

said bolts being bolted to said one end wall and said other end wall;

an end of each of said bolts adjacent said other end wall extending through an associated hollow screw secured to and extending through said other end wall in a sealed relationship, each of said bolts being sealed relative to the interior of said associated hollow screw to enable an adjustment of the axial length of said casing.

2. A brake booster for an automotive vehicle utilizing a pressure differential between a vacuum and atmospheric pressure comprising:

a vacuum casing having a control valve actuated by a brake pedal secured to one end wall thereof, a master cylinder push rod guided axially of said casing extending through the other end wall thereof and at least one movable wall disposed therein dividing said casing into a vacuum chamber and a working chamber and acting on said push rod;

two bolts extending through said casing and said movable wall parallel to said push rod and connected to said one end wall and said other end wall to prevent deformation of said casing due to operating forces acting thereon; and two slide seals disposed in said movable wall each embracing a different one of said two bolts to prevent leaks between said vacuum and working chambers and to enable said movable wall to slide on said bolts;

an end of each of said bolts adjacent said other end wall extending through an associated hollow screw secured to and extending through said other end wall in a sealed relationship, each of said bolts being sealed relative to the interior of said associated hollow screw to enable an adjustment of the axial length of said casing.

3. A brake booster according to claim 1, wherein said end of each of said bolts adjacent the outer end of said associated one of said hollow screws is threaded to receive a first nut to fasten each of said bolts to the outer end of said associated one of said hollow screws and, hence, to fasten each of said bolts to said other end wall.

4. A brake booster according to claim 3, wherein the outer surface of each of said hollow screws is threaded to enable fastening a master cylinder to said brake booster by an associated second nut screwed onto each of said hollow screws.

5. A brake booster according to claim 2, wherein said end of each of said bolts adjacent the outer end of said associated one of said hollow screws is threaded to receive a first nut to fasten each of said bolts to the outer end of said associated one of said hollow screws and, hence, to fasten each of said bolts to said other end wall.

6. A brake booster according to claim 5, wherein the outer surface of each of said hollow screws is threaded to enable fastening a master cylinder to said brake booster by as associated second nut screwed onto each of said hollow screws.

* * * * *